United States Patent
Kim et al.

(10) Patent No.: US 7,534,302 B2
(45) Date of Patent: May 19, 2009

(54) METHOD OF CLEANING FLEXIBLE SUBSTRATE

(75) Inventors: Gi Heon Kim, Daejeon (KR); Kyung Soo Suh, Daejeon (KR); Kyu Ha Baek, Daejeon (KR); In Kyu You, Daejeon (KR); Seung Youl Kang, Daejeon (KR); Seong Deok Ahn, Daejeon (KR); Chul Am Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 11/944,673

(22) Filed: Nov. 26, 2007

(65) Prior Publication Data

US 2008/0135063 A1 Jun. 12, 2008

(30) Foreign Application Priority Data

Dec. 7, 2006 (KR) ...................... 10-2006-0123846

(51) Int. Cl.
*B08B 1/00* (2006.01)
(52) U.S. Cl. .................. 134/6; 134/9; 134/15; 134/21; 134/32; 134/42; 15/3; 15/97.1; 15/100; 15/102; 101/423; 101/424; 101/425; 101/483
(58) Field of Classification Search .............. 134/6, 134/9, 15, 21, 32, 42; 15/3, 97.1, 100, 102; 101/423, 424, 425, 483
See application file for complete search history.

(56) References Cited

U.S. PATENT DOCUMENTS 3,641,605 A * 2/1972 Lindsay ...................... 15/1.51
5,913,345 A * 6/1999 Corrado et al. .................. 15/3
6,186,066 B1 * 2/2001 Kim ........................... 101/423
6,200,392 B1 * 3/2001 Korbonski ..................... 134/9
6,237,176 B1 * 5/2001 Egoshi et al. ..................... 15/3
6,523,208 B1 * 2/2003 Muscato et al. ................... 15/3
2002/0023307 A1 * 2/2002 Haba et al. ........................ 15/3
2006/0086272 A1 * 4/2006 Bennet ......................... 101/425

FOREIGN PATENT DOCUMENTS

| JP | 06-095051 | 4/1994 |
| JP | 2000-254605 | 9/2000 |
| JP | 2000-334406 | 12/2000 |
| JP | 3078286 | 4/2001 |
| JP | 2003-086923 | 3/2003 |
| JP | 2006-130484 | 5/2006 |
| JP | 2006-266461 | 10/2006 |
| KR | 1020040070807 | 8/2004 |
| WO | WO00/12231 | 3/2000 |
| WO | WO2004/034757 | 4/2004 |
| WO | WO2005/038893 | 4/2005 |

* cited by examiner

*Primary Examiner*—Sharidan Carrillo
(74) *Attorney, Agent, or Firm*—Ladas & Parry LLP

(57) ABSTRACT

Provided is a method of cleaning a flexible substrate. The method includes the steps of: preparing a flexible substrate and detaching an impurity adhered to both surfaces of the flexible substrate using rotating first rollers disposed on the both surfaces of the flexible substrate; and removing the impurity by transferring the impurity from the first roller to a second roller using the rotating second roller having a relatively higher adhesion than the first roller.

6 Claims, 2 Drawing Sheets

METHOD OF CLEANING FLEXIBLE SUBSTRATE

CROSS-REFERENCE TO RELATED APPLICATION

This application claims priority to and the benefit of Korean Patent Application No. 2006-123846, filed Dec. 7, 2006, the disclosure of which is incorporated herein by reference in its entirety.

BACKGROUND

1. Field of the Invention

The present invention relates to a method of cleaning a flexible substrate, and more particularly, to a method of efficiently cleaning a flexible substrate using an adhesive cleaning roller and/or a wet cleaning method before the flexible substrate is applied to a process of manufacturing a flexible device using the flexible substrate. The present invention has been produced from the work supported by the IT R&D program of MIC (Ministry of Information and Communication)/IITA (Institute for Information Technology Advancement) [2005-S070-02, Flexible Display] in Korea.

2. Discussion of Related Art

As modern industrial society evolves into a highly information-oriented society, the importance of the display industry, which enables visualization of various types of information, is increasing. Moreover, this trend is expected to continue for some time. As the information revolution progresses, demand for information increases, and in the display field as man-machine interfaces for information delivery, research aimed at satisfying the human sense of sight and expressing the colors and intricacy of nature without regard to time or place is actively progressing.

In general, displays are widely employed in TVs, monitors and mobile phones. However, as technology develops, there is increasing demand for displays that are lightweight and have a wide display area, superior resolution and fast response time.

In response to such demand, efforts to enlarge a display device and reduce the density and thickness of a glass substrate of the display device have been stepped up. However, such efforts cause problems in ensuring processibility and reliability, and thus a technological limit is confronted. An additional problem is that downsizing display devices for portability clashes with consumers' desire for large-sized displays. Thus, in order to simultaneously obtain superior flexibility, portability and lightweight features, a need has arisen for a flexible display in which interconnections and elements of the display are formed on a flexible substrate.

A flexible substrate commonly has static electricity on its surface, and thereby fine dusts may be attached to its surface during manufacturing, storing or delivery. Therefore, it is necessary to clean the flexible substrate before manufacturing a device for displaying images using a flexible substrate.

SUMMARY OF THE INVENTION

The present invention is directed to a method of cleaning a flexible substrate, which can improve processibility and reliability of a flexible device by effectively removing impurities from both surfaces of the flexible substrate using conventional mass-production manufacturing equipment of a flexible device for a display device.

The present invention is also directed to a method of cleaning a flexible substrate which can effectively remove impurities attached to both surfaces of a flexible substrate before being applied to a manufacturing process of a flexible device such as a flexible display, and is suitable for cleaning a large-sized flexible substrate such as a TV screen.

An aspect of the present invention provides a method of cleaning a flexible substrate including the steps of: preparing a flexible substrate and detaching an impurity adhered to both surfaces of the flexible substrate using rotating first rollers disposed on the both surfaces of the flexible substrate; and removing the impurity by transferring the impurity from the first roller to a second roller using the rotating second roller having a relatively higher adhesion than the first roller.

The cleaning method may further include the step of removing static electricity from the flexible substrate using anti-static equipment.

Another aspect of the present invention provides a method of cleaning a flexible substrate including the step of loading a flexible substrate wound on a first rotating drum between the first rotating drum and a second rotating drum, and cleaning the flexible substrate by spraying cleaning liquid onto the flexible substrate while unwinding the flexible substrate.

The cleaning method may further include the step of recovering the cleaning liquid sprayed onto the flexible substrate using air or nitrogen.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF EXEMPLARY EMBODIMENTS

Hereinafter, the present invention will be described in detail with reference to drawings illustrating exemplary embodiments of the present invention. These exemplary embodiments are provided so that this disclosure will be thorough and complete.

Figure 1:
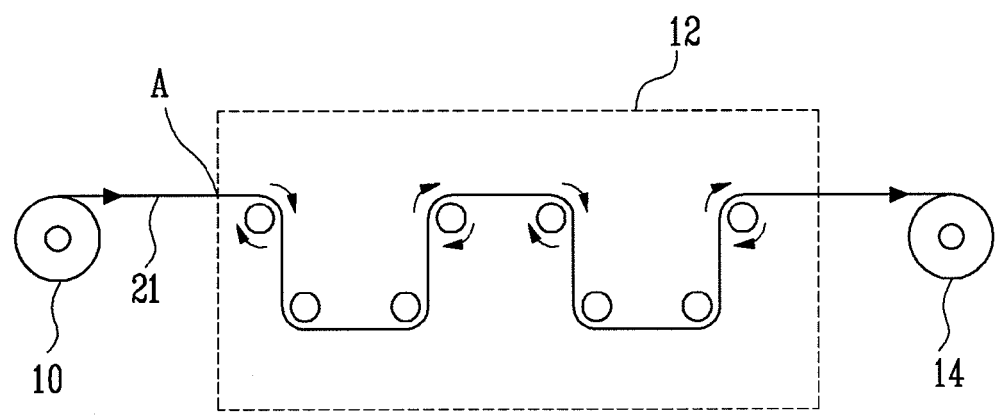
FIG. 1 schematically illustrates a process of manufacturing a flexible device to which a method of cleaning a flexible substrate according to an exemplary embodiment of the present invention is applied.

FIG. 1 schematically illustrates a process of manufacturing a flexible device to which a method of cleaning a flexible substrate according to an exemplary embodiment of the present invention is applied. In this exemplary embodiment, the manufacturing process will be described using a flexible display as a flexible device.

Referring to FIG. 1, the process of manufacturing a flexible display device according to an exemplary embodiment of the present invention includes a series of processes of producing a flexible display device 14 through a roll-to-roll process 12 using a flexible substrate 21 unwinding from a raw material roll 10 in order to reduce production costs. Here, prior to the roll-to-roll process 12, a process A of effectively cleaning the flexible substrate 21 using a cleaning apparatus of the present invention is included.

The aforementioned cleaning process A is essential to increase processibility and reliability of the flexible device manufactured in a roll-to-roll process 12 to be performed later by effectively removing impurities attached to both surfaces of the flexible substrate 21 during manufacturing, delivery and storing. The cleaning process A may be performed before the roll-to-roll process 12, and additionally performed during or after the roll-to-roll process 12, if necessary.

If the flexible display device is a flexible active matrix organic light emitting diode (AMOLED), the roll-to-roll process 12 includes an ink-jet or lithography process for forming a TFT or OTFT, a process for forming a conductor such as metal, ITO or carbon, a gravure or offset laser printing process for forming an organic or polymer layer, and an encapsulation process for forming a passivation layer.

Figure 2:
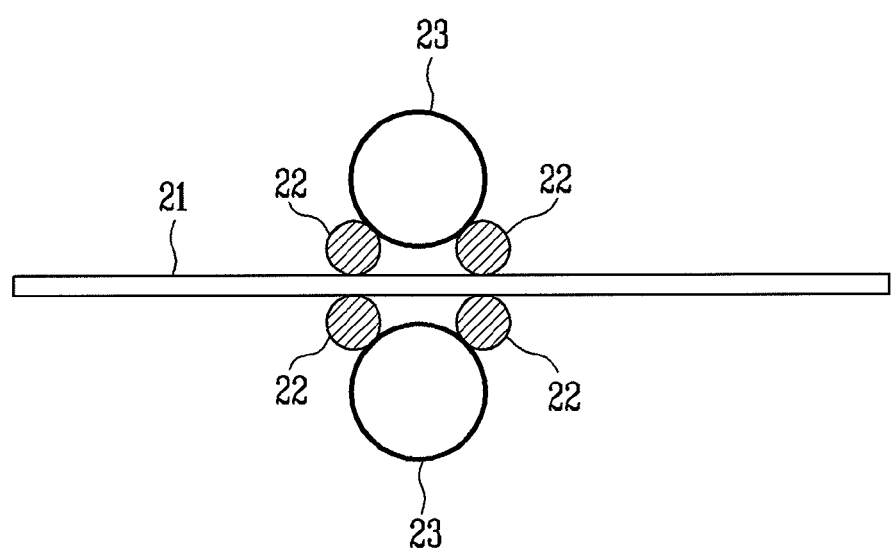
FIG. 2 is a schematic diagram of a cleaning apparatus for a flexible substrate according to an exemplary embodiment of the present invention.

FIG. 2 is a schematic diagram of a cleaning apparatus for a flexible substrate according to an exemplary embodiment of the present invention.

Referring to FIG. 2, the cleaning apparatus for a flexible substrate in this exemplary embodiment includes a plurality of first rollers 22 for cleaning impurities attached to the both surfaces of the flexible substrate 21, and a second roller 23 for transferring the impurities attached to the plurality of first rollers 22.

The flexible substrate 21 may be a flexible substrate unwinding from a row material roll or a flexible substrate on a sheet for manufacturing at least one flexible device. The flexible substrate 21 may be formed of metal foil or thin glass, or preferably plastic because it is lightweight and easily handled to be formed in any shape compared to other materials. The thin glass is commonly formed to a thickness of 50 to 200 μm using glass having a thickness of 700 μm, and the metal foil may be stainless steel coated with an insulator. Meanwhile, impurities such as unwanted dust or fine particles may be attached to the flexible substrate 21 during the manufacturing, or storing and delivery of the substrate 21 due to surface static electricity, and thus the flexible substrate 21 needs to be cleaned before the roll-to-roll process for the flexible device manufacturing.

The cleaning apparatus for a flexible substrate in this exemplary embodiment includes a set of adhesive first and second rollers 22 and 23 for cleaning a flexible substrate 21 to remove impurities attached on both surfaces of the flexible substrate 21, and another set of adhesive first and second rollers 22 and 23 for cleaning disposed under the flexible substrate 21.

A distance between the first roller 22 and the second roller 23 is adjusted by air pressure to be closely adhered to the flexible substrate 21, wherein the air pressure may be in a range of about 0.1 to 10 kg/cm$^2$ to prevent damage to the flexible substrate 21 and be closely adhered thereto.

The cleaning apparatus for a flexible substrate can be operated as follows. First, the flexible substrate 21 is inserted between the plurality of first rollers 22 rotating in the same direction on and under the flexible substrate 21 for both-side cleaning. Here, adhesion strength of the first roller 22 is defined as peel strength (N/100 mm) by the American Society for Testing and Materials (ASTM) 3350 measurement method, which is properly 0.2 to 100N/100 mm in consideration of reliability and processibility of cleaning. The fine impurities adhered to the surface of the flexible substrate 21 are adhered to an adhesive on the first roller 22 during passing between the first rollers 22. The fine impurities adhered to the first roller 22 are removed by being in contact with the second rollers 23 having an adhesion strength of 0.3 to 100N/100 mm stronger than that of the first roller 22 and transferred to the second roller 23.

Spaces between the first roller 22, the second roller 23 and the flexible substrate 21 are controlled by air pressure, which may be different according to the size and purpose of the flexible substrate 21, and preferably about 0.1 to 10 kg/cm$^2$.

The numbers of the first and second rollers disposed on and under the flexible substrate 21 may depend on the size of the flexible substrate 21 and the cleaning degree, wherein the number of the first rollers 22 respectively disposed on and under the substrate is commonly two to six, and the number of the second rollers 23 respectively disposed on and under the substrate is one to five. The first roller 22 under the flexible substrate 21 may be replaced with a non-adhesive roller or a fixed supporting plate. The cleaning apparatus for a flexible substrate using the roller of the present invention described above may be operated in an inert atmosphere or in a vacuum to improve cleaning performance.

Meanwhile, the cleaning apparatus for a flexible substrate in this exemplary embodiment may additionally include an anti-static bar or anti-static equipment using a neutral solution in the front or back part of the first roller 22.

Figure 3:
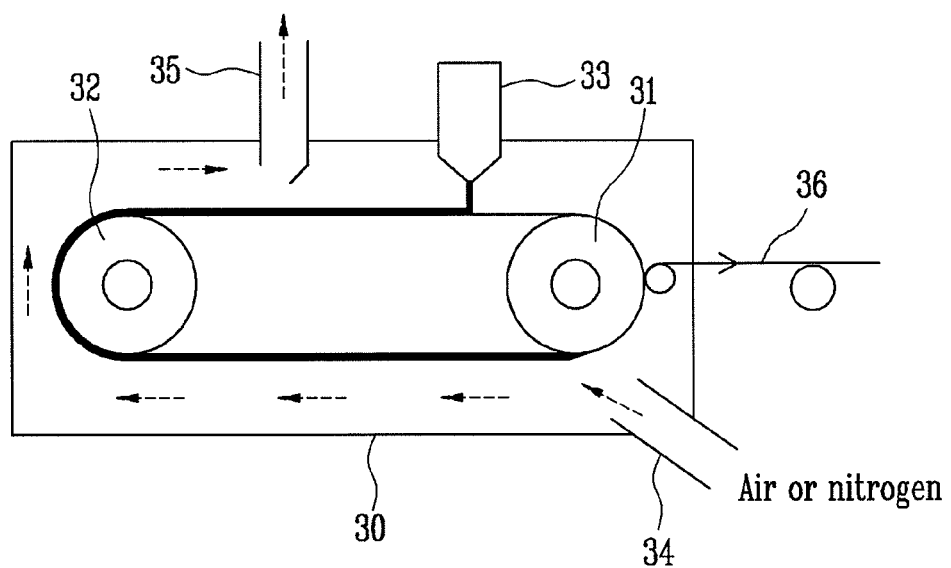
FIG. 3 is a schematic diagram of a cleaning apparatus for a flexible substrate according to another exemplary embodiment of the present invention.

FIG. 3 is a schematic diagram of a cleaning apparatus for a flexible substrate according to an exemplary embodiment of the present invention.

Referring to FIG. 3, the cleaning apparatus for a flexible substrate in this exemplary embodiment includes a chamber 30, a first rotating drum 31, a second rotating drum 32, a cleaning liquid sprayer 33 connected with the chamber 30, an inlet 34 connected with the chamber 30 and an outlet 35 connected with the chamber 30.

The chamber 30 is to control the cleaning process at a normal pressure in an inert gas atmosphere or in a vacuum. The first rotating drum 31 is a raw material roll on which the flexible substrate is wound. The second rotating drum 32 is to load the flexible substrate 36 between the first and second rotating drums 31 and 32.

In this exemplary embodiment, in order to provide the flexible substrate 36 unwinding from the first rotating drum 31, i.e., a raw material roll, to a roll-to-roll process for manufacturing a flexible device, or to rewind the flexible substrate 36 unwinding from the first rotating drum 31 around another rotating drum (not illustrated), the flexible substrate 36 may be loaded between the first rotating drum 31 and the second rotating drum 32 in the chamber 30, and cleaned by spraying a cleaning liquid between the first rotating drum 31 and the second rotating drum 32 through the cleaning liquid sprayer 33 connected to the chamber 30. Here, in order to recover the cleaning liquid and dry the cleaned substrate, air or nitrogen is added through the inlet 34 connected with the chamber 30. For the recovery of the cleaning liquid, the air or nitrogen added into the chamber 30 is drained to the solvent outlet 35 together with a solvent. Depending on the characteristics and usage of the flexible substrate, approximately 1 to 10 cleaning liquid sprayers 34 spraying the cleaning liquid may be formed.

The cleaning liquid may include at least one mixture selected from neutral detergent, isopropyl alcohol, methanol, acetone, ethanol, butanol, propanol and water.

The cleaning method according to this exemplary embodiment may be applied to a flexible substrate wound around a roll or a sheet-formed flexible substrate. The cleaning method may increase a cleaning effect in an inert gas atmosphere or in a vacuum.

The cleaning method for a flexible substrate is advantageous to effectively clean one or both surfaces of the flexible substrate in a short time, and to manufacture a large-sized flexible display. In particular, a flexible substrate and/or a flexible device may be effectively cleaned before, during or after a roll-to-roll process in combination with the cleaning apparatuses of the exemplary embodiments described above, and thus a separate cleaning step is not required.

As described above, a cleaning method applied to realize a flexible device according to the present invention may be applied without modification of mass-production equipment of a conventional semiconductor or display device, and have high commercial applicability which may ensure reliability and mass-producibility of the process. Thus, this method may contribute to an increase in efficiency during the manufacturing process of the flexible substrate.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of cleaning a flexible substrate, comprising the steps of:
   preparing a flexible substrate and detaching an impurity adhered to both surfaces of the flexible substrate using a plurality of rotating first rollers disposed on the both surfaces of the flexible substrate; and
   removing the impurity by transferring the impurity from a pair of the plurality of rotating first rollers to a rotating second roller using the rotating second roller having a higher adhesion strength than the plurality of rotating first rollers, and
   wherein the higher adhesion strength of the second roller is 0.3 to 100N/100mm stronger than an adhesion strength of each of the pair of the plurality of rotating first rollers.

2. The method according to claim 1, wherein a distance between the first and second rollers is controlled by air pressure, which is in a range from 0.1 to 10 kg/cm$^2$.

3. The method according to claim 1, wherein each of the pair of the first rollers has an adhesion strength of 0.2 to 10N/100mm.

4. The method according to claim 1, further comprising the step of removing static electricity from the flexible substrate using anti-static equipment.

5. The method according to claim 1, wherein the steps of detaching and removing the impurity by transferring are performed in an inert gas atmosphere or in a vacuum.

6. The method according to claim 1, wherein the flexible substrate comprises an image display device.

* * * * *